(12) United States Patent
Muller et al.

(10) Patent No.: US 11,138,084 B2
(45) Date of Patent: *Oct. 5, 2021

(54) NEGATIVE PATH TESTING IN A BOOTLOADER ENVIRONMENT

(71) Applicant: VMware, Inc., Palo Alto, CA (US)

(72) Inventors: Daniel Muller, Palo Alto, CA (US); Andrei Warkentin, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,148

(22) Filed: Nov. 21, 2019

(65) Prior Publication Data

US 2020/0089588 A1 Mar. 19, 2020

Related U.S. Application Data

(63) Continuation of application No. 15/652,363, filed on Jul. 18, 2017, now Pat. No. 10,489,258.

(51) Int. Cl.
| | |
|---|---|
| *G06F 11/00* | (2006.01) |
| *G06F 11/26* | (2006.01) |
| *G06F 9/4401* | (2018.01) |
| *G06F 11/22* | (2006.01) |
| *G06F 11/07* | (2006.01) |
| *G06F 11/30* | (2006.01) |

(52) U.S. Cl.
CPC ............ *G06F 11/26* (2013.01); *G06F 9/4401* (2013.01); *G06F 11/0793* (2013.01); *G06F 11/2205* (2013.01); *G06F 11/2215* (2013.01); *G06F 11/2284* (2013.01); *G06F 11/3065* (2013.01)

(58) Field of Classification Search
CPC ............ G06F 11/2215; G06F 11/0793; G06F 11/2273; G06F 11/3065; G06F 11/36; G06F 9/4401
See application file for complete search history.

(56) References Cited

U.S. PATENT DOCUMENTS

| | | | |
|---|---|---|---|
| 7,379,846 B1 | 5/2008 | Williams et al. | |
| 2003/0172321 A1* | 9/2003 | Wolin | ................. G06F 11/2215 714/41 |
| 2003/0216903 A1 | 11/2003 | Bowers et al. | |
| 2005/0015702 A1 | 1/2005 | Shier et al. | |
| 2007/0050686 A1 | 3/2007 | Keeton et al. | |

(Continued)

OTHER PUBLICATIONS

BIOS Implementation Test Suite (BITS) (2 pgs) https://raw.githubusercontent.com/biosbits/bits/master/README.txt Accessed: Jun. 13, 2017.

(Continued)

*Primary Examiner* — Charles Ehne
(74) *Attorney, Agent, or Firm* — Thomas | Horstemeyer LLP

(57) ABSTRACT

Negative path testing in a bootloader environment can include backing up a global state of a component under test, injecting a fault to trigger an error in the component under test in a bootloader environment, executing error handling instructions until a checkpoint of the component under test in the bootloader environment is reached, restoring the global state to the component under test from the backup, and restarting the component under test.

20 Claims, 4 Drawing Sheets

(56) References Cited

U.S. PATENT DOCUMENTS

| | | | |
|---|---|---|---|
| 2008/0307258 A1* | 12/2008 | Challenger | G06F 11/1482 714/20 |
| 2011/0185433 A1 | 7/2011 | Amarasinghe et al. | |
| 2011/0239048 A1 | 9/2011 | Andrade et al. | |
| 2014/0059336 A1 | 2/2014 | Rugina | |
| 2014/0189449 A1 | 7/2014 | Jang et al. | |
| 2014/0289564 A1 | 9/2014 | Rugina et al. | |
| 2016/0299786 A1 | 10/2016 | De Smet et al. | |
| 2017/0060715 A1 | 3/2017 | Ye et al. | |

OTHER PUBLICATIONS

Installing ESXi Using PXE, VMware vSphere 6.0 (2015) (18 pgs) hhttps://www.vmware.com/content/dam/digitalmarketing/vmware/en/pdf/techpaper/vsphere-esxi-vcenter-server-60-pxe-boot-esxi.pdf Accessed: Jun. 13, 2017.

Syslinux—Syslinux Wiki (Mar. 26, 2017) (18 pgs) https://www.syslinux.org/wiki/index/php?title =SYSLINUX Accessed: Jun. 13, 2017.

Grub2/Troubleshooting—Community Help Wiki (Feb. 27, 2013) (11 pgs) https://help.ubuntu.com/community/Grub2/Troubleshooting Accessed: Jun. 13, 2017.

* cited by examiner

NEGATIVE PATH TESTING IN A BOOTLOADER ENVIRONMENT

CROSS-REFERENCE TO RELATED APPLICATIONS

This application is a continuation of and claims the benefit of U.S. patent application Ser. No. 15/652,363, entitled "NEGATIVE PATH TESTING IN A BOOTLOADER ENVIRONMENT," and filed Jul. 18, 2017, which is hereby incorporated by reference in its entirety.

BACKGROUND

The execution of an initial set of operations that a computer system performs when the computer system is powered on is known as "booting" and the environment may be referred to as a "bootloader environment." The boot process begins when a computer that has been turned off is turned on again, and ends when the computer is ready to perform its normal operations, typically when system software (e.g., operating system, virtualization software known as a hypervisor, etc.) has been loaded. The sequence of instructions that are executed during this boot process is referred to as a "boot sequence." It should be also recognized that the boot process may begin pursuant to a software reset where power is not interrupted, and may involve streaming in an image of the system software through a network connection, such as in network booting (e.g., preboot execution environment (PXE)). Furthermore, the boot process may include more abbreviated forms of booting, such as resume from hibernation. Thus, as used herein, the term "bootloader environment" should be interpreted broadly to include any low level process (outside of the operating system itself) pursuant to which system software is loaded into memory and is inclusive of hypervisor and operating system kernel environments, firmware such as basic input/output system (BIOS), and bootloaders.

Testing low level system components, particularly those that are only used in a bootloader environment, can be cumbersome. Boot loaders and other intermediate programs, for example, are only resident in memory for a brief time and will not be available after a successful boot up, when it would be natural for the system to be tested. Instead, the act of booting up itself acts as a test. If the system boots up successfully, the intermediate components may be considered to have done their job.

DETAILED DESCRIPTION

Figure 1:
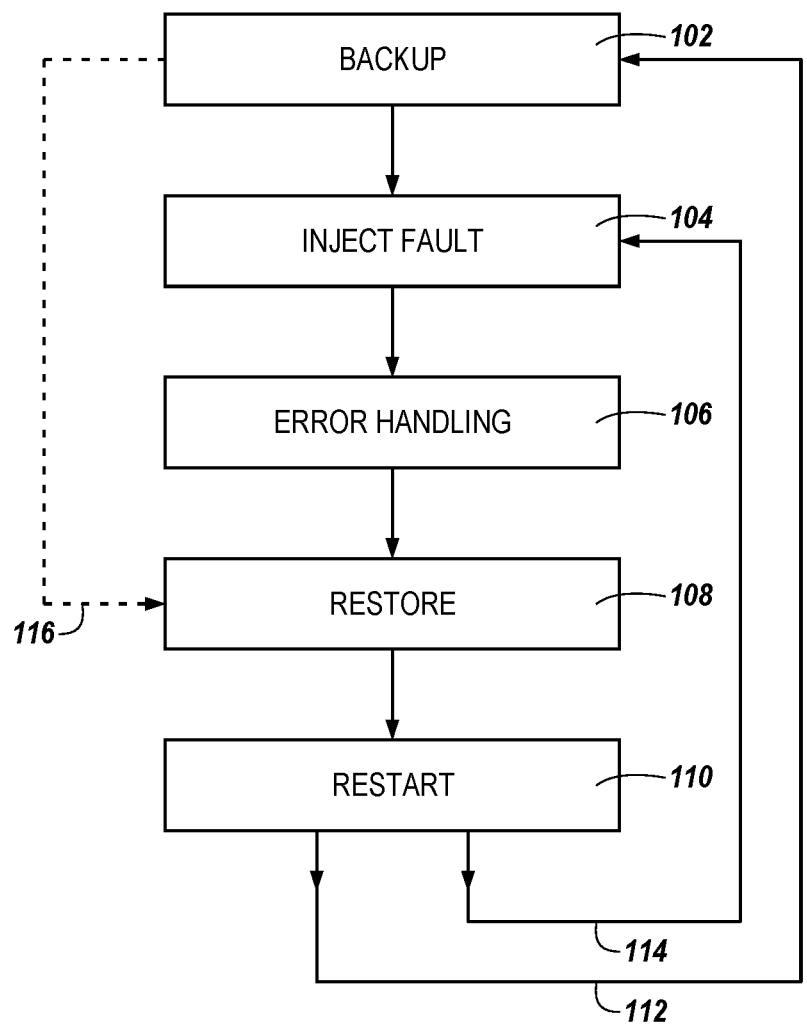
FIG. 1 is a flow chart illustrating negative path testing in a bootloader environment according to a number of embodiments of the present disclosure.

In some instances, the act of booting up itself may be regarded as a test, where if the system boots up successfully it can be assumed that the components that contributed to the booting process operated correctly. However, such approaches have a downside of exercising few executable instruction paths. A successful boot implies that a certain set of executable instruction paths have been taken (the "usual" executable instruction paths). Executable instruction paths other than those in the "usual" set are therefore normally not executed. For example, executable instruction paths involved in handling error conditions signaled by the hardware or a hardware component that is not available or not responding may not typically be executed. In the course of developing software, it can be desirable to be able to test these uncommon or "negative" executable instruction paths in order to determine whether error handling instructions, which have been developed to address known or expected errors, are operating correctly. Without such negative path testing and in the absence of triggering errors, certain pieces of the error handling instructions may not execute, which is also known as dead cleanup code.

According to at least one embodiment of the present disclosure, negative path testing can include modeling different errors, validating that an error condition is handled correctly, and restarting the component under test in order to test the next error condition. However, in a bootloader environment, this type of testing is limited because it can be challenging to force a controlled reload of the component under test in the extremely limited environment of the bootloader itself, which frequently operates in a way where firmware, disk, network, and input/output facilities are already disabled. If a per-test reload of the component under test is regarded as a simple reentry of the bootloader, this is problematic because the software components can mutate their global state while running during the boot process. Therefore, simply returning to an entry point to the component under test is not sufficient for more than one test because the global state would not match the initial state at the first test. For example, portions of the software may have been initialized and may not expect to be initialized again. As another example, portions of the software might rely on the boot process being further along in a sequence. As another example, certain executable instruction sequences might be skipped.

At least one embodiment of the present disclosure provides an approach to negative path testing in a bootloader environment that can allow for testing different error conditions and restarting the component under test to continue further testing. In particular, the negative path testing described herein can improve the functionality of various computing devices by more thoroughly testing the error handling instructions associated with bootloader environments of the computing devices than was possible previously. The improved testing allows for the discovery of errors that may have otherwise gone undetected. Discovering such errors can allow them to be corrected by developers before release.

The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. As used herein, the designators "M", "N", and "P", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a flow chart illustrating negative path testing according to a number of embodiments of the present disclosure. At 102, the method can include backing up a global state of a component under test. As used herein, a component under test is a software component of a bootloader environment. A global state is the collection of values of portions of the component under test that are mutable in the bootloader environment. The collection of values can be applied to the respective portions of the component under test to return it to its global state at the entry to the negative path testing. The global state of the component under test does not refer to a hardware state because the component under test is generally used to set up data structures (as opposed to hardware settings) so a kernel can begin to execute. The global state can be backed up as part of the initialization of the component under test. The global state can be backed up prior to any changes to the global state (that would occur) during execution of the component under test.

At 104, the method can include injecting a fault to trigger an error in the component under test in a bootloader environment. More extensive testing can be performed by artificially triggering error paths by injecting faults (e.g., error conditions) at chosen points. For example, the enablement of a certain processing resource feature as performed by a function in the executable instructions can be made unsuccessful by not executing the function, but indicating that it returned an error code. This may be referred to as fault injection. Each fault injection can be designed to trigger a respective particular error. For embodiments in which multiple faults are injected over time, the errors to be triggered can be numbered using increasing integers. For example, after restarting the component under test, a second fault can be injected to trigger a second error in the component under test.

Various properties of intermediate components can be taken advantage of to facilitate execution of a wider range of executable instruction paths while keeping the overall workings of the system unchanged. An intermediate component is a component whose execution will be succeeded by the execution of a followed-up component in the bootloader environment (prior to completion of the system boot). An intermediate component executes for a limited amount of time and includes one or more well defined entry and exit points. An entry point is the point in the executable instructions where execution begins and/or where control is transferred to the component. The entry point may be at the beginning of the executable instructions or at an offset therefrom. An exit point is where execution of the executable instructions ends and/or where control is transferred from the component to a next component. The state of the environment both before and after execution of the intermediate component is known. The various properties of the intermediate component facilitate re-execution of the intermediate component at least once, and in some embodiments, multiple times.

At 106, the method can include executing error handling instructions until a checkpoint of the component under test in the bootloader environment is reached. A checkpoint is a point in the flow of the software as executed where a check, enablement, or other condition can be examined to determine whether the execution of the instructions was successful or preceded as intended. The exit point is an example of a checkpoint, however there can be checkpoints in the flow of executable instructions prior to the exit point. At a checkpoint, the injected fault can induce an error (e.g., failure). The induced failure can be manifested as a condition assumed to be false being flipped to true. The error handling instructions can check to see "if error" is true or false. Assuming there is no error, the expected sate is "false". However, if at the checkpoint, the state is "true" then appropriate cleanup instructions can be executed to address the error and exit. Prior to injecting a fault and/or prior to beginning the negative path test, errors in the component under test can be modeled and error handling instructions can be developed based on the modeling.

At 108, the method can include restoring the global state to the component under test from the backup (as indicated by dashed arrow 116, which indicates a data path rather than a method flow path). In at least one embodiment, the global state can be restored after the checkpoint and before continuing normal execution of instructions such as would normally occur (e.g., by transferring control to the next component in the case of an exit point). Restoring the global state of the component under test can help ensure that the component will proceed in the same fashion as the first test in any subsequent tests (subject to different faults being injected).

At 110, the method can include restarting the component under test. The component under test can be restarted while in the bootloader environment (e.g., without transferring control to the next component). Restarting the component under test after restoring the global state is in contrast to undoing or cleaning the mutated state of the component under test prior to restarting the component because it does not require excess executable instructions for undoing or cleaning the mutated state, which could be quite voluminous. Furthermore, such instructions to undo or clean the mutated state may create a fragile component that may be prone to regressions during the software lifecycle because developers would be required to remember to add the state cleanup functionality for all of the instructions being added. Thus, restoring the global state is a much more scalable solution.

As indicated at 112, some embodiments can include iteratively backing up the global state of the component under test, injecting a different fault to trigger a different error in the component under test for each iteration, executing error handling instructions until a checkpoint of the component under test, restoring the global state to the component under test from a previous backup, and restarting the component under test. Iterative embodiments can include maintaining a count of a quantity of iterations. The count can be stored separately from the global state such that the count is not backed up or restored by the negative path testing process. The count can be iterated until the count is equal to a predefined quantity of modelled errors for which the component under test is to be tested. Such embodiments can provide coverage for all known error paths that can be reached with a given hardware configuration during a boot.

As indicated at 114, some embodiments can include iteratively injecting a different fault to trigger a different error in the component under test for each iteration without iteratively backing up the global state (e.g., the global state is backed up at the outset of the negative path testing, but not on each iteration), executing error handling instructions until a checkpoint of the component under test, restoring the global state to the component under test from the backup, and restarting the component under test.

Some open source boot loaders may contain unit tests that can check the correctness of algorithms, however they do not target instructions on any other level or in integrated form and they do not perform negative path testing. Some proprietary boot loaders may be tested merely by executing them at boot up and determining whether the boot was successful without negative path testing. Some BIOS test suites may invoke functionality of a particular BIOS implementation and check for an expected positive and negative result of a specific API, as defined by a specification, however the testing suite may be started as a separate entity and does not constitute an exhaustive "power-on self-test" of sorts of all the internals of a component under test.

Figure 2:
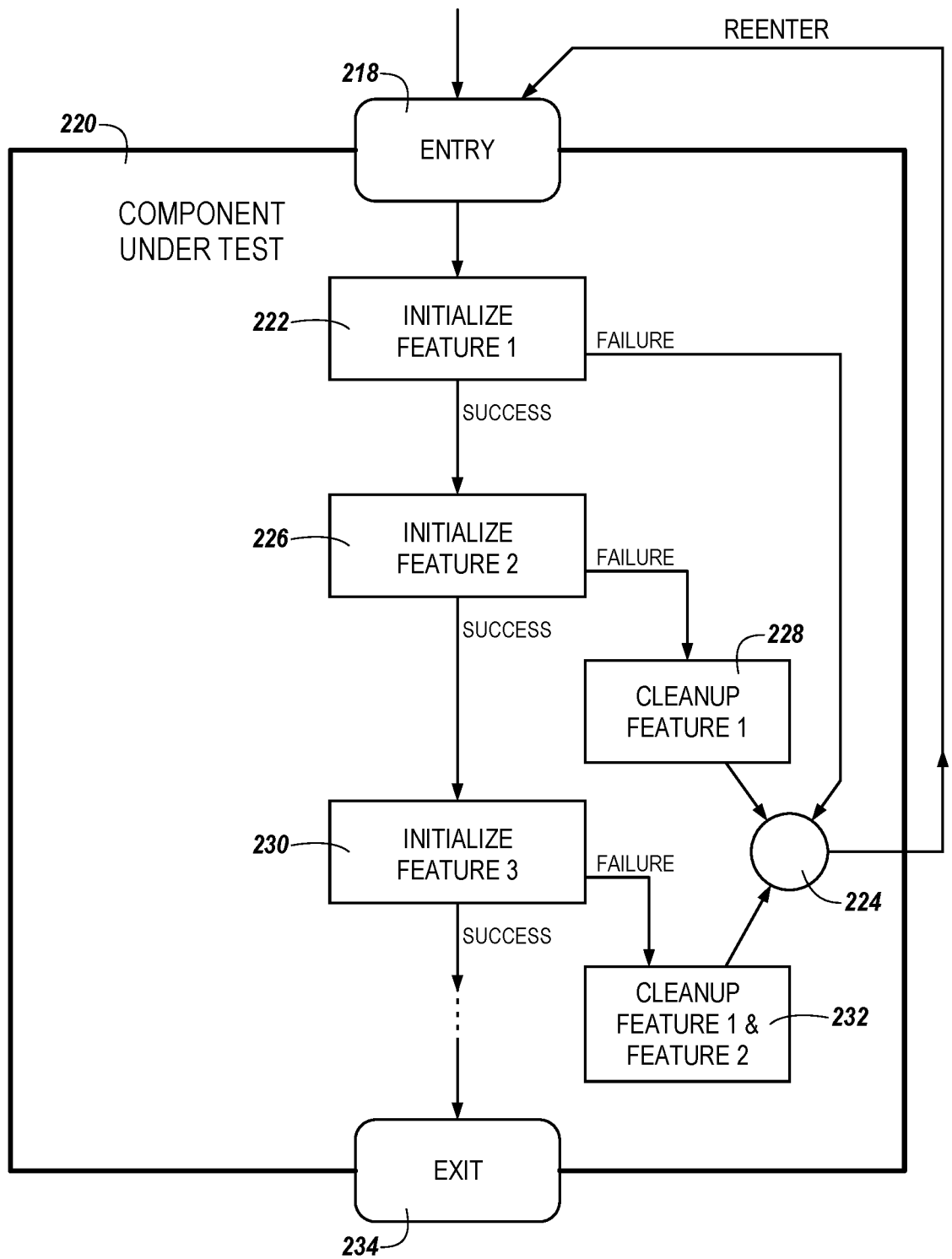
FIG. 2 is a flow chart illustrating negative path testing in a bootloader environment according to a number of embodiments of the present disclosure.

FIG. 2 is a flow chart illustrating negative path testing in a bootloader environment according to a number of embodiments of the present disclosure. In comparison to FIG. 1, FIG. 2 illustrates some additional steps that can be taken when a feature of the component under test 220 changes a hardware state of the system. In such instances, in addition to restoring the global state of the component under test 220, it may be beneficial to restore the previous hardware state. The other details of the negative path testing illustrated and described with respect to FIG. 1 are generally omitted in FIG. 2 so as not to obscure the illustration and description of the details therein. In this example, the component under test 220 is illustrated with three features that can be initialized at 222, 226, and 230 respectively. However embodiments are not limited to a particular quantity of features. The illustrated features are intended to be initialized in the order illustrated. Therefore, assuming that there are no errors, after entry to the component under test 220 at 218, the first feature would be initialized at 222, then the second feature would be initialized at 226, then the third feature would be initialized at 230, then the component under test would exit at 234. The entry point 218 can represent either or both of a low level language entry point or a high level language entry point to the component under test 220. In general, a low level language is a programming language that provides little or no abstraction from a computer's instruction set architecture. Examples of low level languages are assembly language and machine code. In contrast, a high level language is a programming language with strong abstraction from the details of the computer, and which uses a compiler.

However, a fault can be injected for any or all of the features of the component under test 220 to be initialized. For example, if a fault is injected for the first feature, then error handling instructions can be triggered, as described in more detail with respect to FIG. 1, until the error handling instructions proceed to a checkpoint 224. After the checkpoint 224, the global state of the component under test can be restored and the component under test can be reentered at 218.

If a fault is injected for the second feature, then initialization of the first feature at 222 should meet with success and the second component can be initialized at 226. The fault injected for the second feature can trigger the error handling instructions. Because a previous feature was initialized, the error handling instructions can clean up the previously initialized feature at 228, which means that any hardware states that were changed by the first feature can be restored to a previous setting until the error handling instructions reach a checkpoint at 224. As used with respect to FIG. 2, clean up refers to generic processing resource re-initialization (if necessary) and any necessary hardware input/output. The instructions controlling the component under test do not include specific clean up instructions as part of the testing functionality. Rather, the cleanup illustrated in FIG. 2 indicates that hardware states can be restored if necessary. After the checkpoint 224, the global state of the component under test can be restored and the component under test can be reentered at 218.

If a fault is injected for the third feature, then initialization of the first feature at 222 should meet with success, the initialization of the second feature should meet with success at 226, and the third component can be initialized at 230. The fault injected for the third feature can trigger the error handling instructions. Because previous features were initialized, the error handling instructions can clean up the previously initialized features at 232, which means that any hardware states that were changed by the first feature and the second feature can be restored to a previous setting until the error handling instructions reach a checkpoint at 224. After the checkpoint 224, the global state of the component under test can be restored and the component under test can be reentered at 218.

An example of pseudo-code for the present disclosure follows:

```
TestInit(TRUE); // Initialize the framework.
...
If (TEST_ERROR_PATH(YYY,
SYMBOLIC_NAME_OF_CONDITION_1) {
    // The testing framework might have induced an error here that
    // is otherwise rarely exhibited.
    return;
}
SomeSetup( );
if (TEST_ERROR_PATH(ZZZ,
SMBOLIC_NAME_OF_CONDITION_2)) {
    SomeCleanup( );
    return;
}
//Restart bootloader's execution if not all (reachable) error paths were
covered.
TestRestartIfNeeded( );
```

Figure 3:
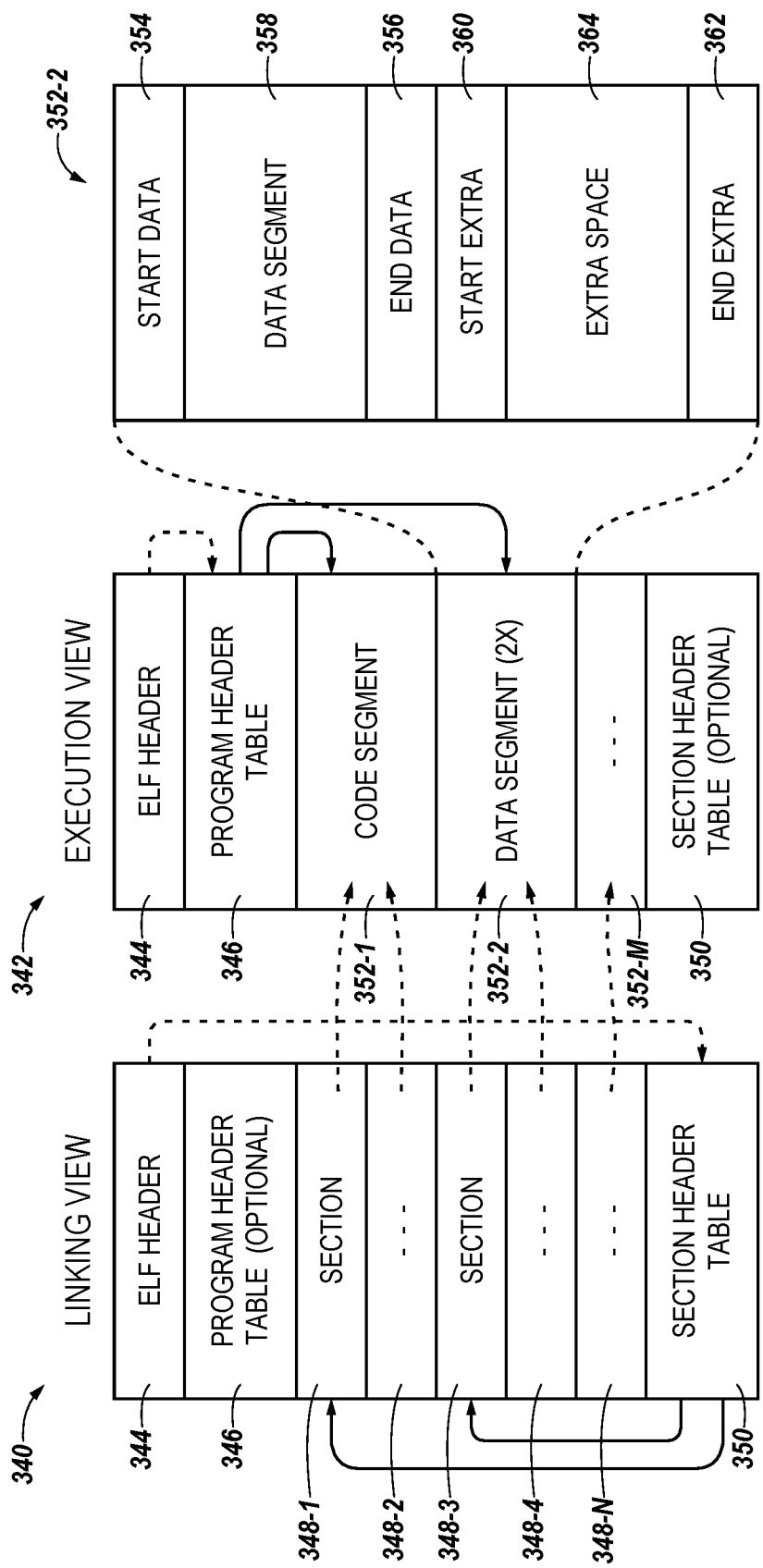
FIG. 3 is a block diagram illustrating an example of backing up the global state as part of the initialization of the component under test.

FIG. 3 is a block diagram illustrating an example of backing up the global state as part of the initialization of the component under test. The example illustrated in FIG. 3 uses the Executable and Linkable Format (ELF), which is a standard file format for executable files, object code, shared libraries, and core dumps. However, embodiments are not limited to the use of ELF. One of ordinary skill in the art can apply the teachings of the present disclosure discussed herein with respect to this example format to other formats.

An ELF file can be made up of an ELF header 344 followed by data, such as a program header table 346, a section header table 350, and data sections 348-1, 348-2, 348-3, 348-4, . . . , 348-N in the linking view 340 or data segments 352-1, 352-2, . . . , 352-M in the execution view 342. The ELF header 344 can include various definitions and pointers. Examples of definitions in the ELF header 344 include whether to use 32-bit or 64-bit addresses, a target operating system, and an instruction set architecture (e.g., x86, ARM, etc.). Examples of pointers in the ELF header 344 include a pointer to the section header table 350 as indicated by the dotted arrow shown in the linking view 340 and/or a pointer to the program header table 346 as illustrated by the dotted arrow shown in the execution view 342. The program header table 346 can describe the data segments as shown in the execution view 344 by the arrows from the program header table 346 to various data segments 352. The section header table 350 can describe the data sections as shown in the linking view 340 by the arrows from the program header table 346 to various data sections 348.

In at least one embodiment, software can be packaged in an object format. The linking view 340 of the software, which may also be referred to as the linker view, includes sections 348 for each object file, such as .text for executable instructions and read only data, .data for initialized data and read-write data, and .bss for uninitialized data, etc. The execution view 342 of the software, which may also be referred to as the loader view, is segments 352, where the various sections 348 are put into segments 352 such as .text, .data, .bss, etc.

According to some previous approaches, the size of a data segment 352-2 was generally equal to the sum of the sizes of the corresponding data sections 348-3, 348-4, with some possible exceptions for differences in metadata or other variations unrelated to the size of the data itself. However, according to at least one embodiment of the present disclosure, the data segment 352-2 is made at least twice as large as the corresponding data sections 348-3, 348-4. For example, customized linker instructions that control the linking behavior of the linker can be employed to make the data segment 352-2 at least twice as large as the corresponding data sections 348-3, 348-4. Such a data segment 352-2 may be referred to herein as an "enhanced data segment." The enhanced data segment 352-2 can be used to store both the mutable portions of the component under test (e.g., initialized data) as well as the backed up global state (the version of the initialized data before any changes were made as part of operation or testing).

A start 354 and an end 356 of a first portion 358 of the enhanced data segment 352-2 containing real initialized data can be labeled. For example, the labels can be "_startData" and "_endData". The first portion 358 of the enhanced data segment 352-2 containing the initialized data is the portion that would normally correspond to the data sections 348-3, 348-4. The second portion 364 of the enhanced data segment 352-2 can comprise extra space, which can be used as a backup as described in more detail below. A start 360 and an end 362 of the second portion 364 of the enhanced data segment 352-2 can be labeled. For example, the labels can be "_startDataBackup" and "_endDataBackup". A software component (such as a component under test) can clear uninitialized data (e.g., .bss) as an entry point (e.g., entry point 218 illustrated in FIG. 2) to the component under test. The software component can save the initialized data between the start 354 and the end 356 of the first portion 358 to the second portion 364. In some embodiments, saving the initialized data from the first portion to the second portion can be the first call performed by the component under test as an entry point (e.g., entry point 218 illustrated in FIG. 2).

After a fault is injected to trigger an error in the component under test, the error handling can be triggered and performed for the component under test until a checkpoint of the component under test is reached. Any changes to the initialized data would be reflected in the first portion 358, but not the second portion 364 of the enhanced data segment 352-2. When a reset or re-entry is required as part of the negative path testing framework, the global state (the initial initialized data) can be restored by copying memory between the start 360 of the second portion 364 and the end of the second portion 362 to the first portion 358 (e.g., beginning at the start 354 of the first portion 358). Processing resource architecture-specific operations can be performed to ensure that the processing resource is in an expected state for the entry point (e.g., low level language entry point) of the component under test. Subsequent to the restoration of the global state and/or the performance of the architecture-specific operations, the instructions can branch to the entry point of the component under test (e.g., for normal operation or for further testing).

It may be advantageous to maintain the state of a plurality of variables across reentrances to the entry point in a particular section 348-N separate from the data sections 348-3, 348-4. The particular section 348-N is not subject to the instructions to save and to restore the initialized data. The save and restore operations occur in the enhanced segment 352-2, which corresponds to sections 348-3, 348-4. In contrast, the particular section 348-N corresponds to segment 352-M and is therefore not part of the save and restore operations.

An example of such a variable is a counter for a quantity of reentries to the entry point. By storing such a variable in a persistent fashion across reentrances to the entry point, the system is able to keep track of how many tests have been run and, for example, how many faults have been injected. In some embodiments, the instructions to inject a fault can comprise instructions to inject a different fault to trigger a different error for each reentrance to the entry point. In such embodiments, maintaining the count can be beneficial for tracking how many of a desired number of negative paths have already been tested. For example, an enumerated data type "enum" (e.g., "TestPath") can be used to represent the different conditions that can fail. Associated with the enum, an array of Booleans can be indexed by a path to indicate whether the negative path has been tested or not. This information can be used to decide whether or not to inject a corresponding fault for an error path so as to avoid injecting a fault for the same path multiple times. The determination whether to return to the entry point of the component under test can be determined by examining the value of the Boolean that is set to "true" when a fault is injected and cleared once the error is cleaned up. If the Boolean is set to "false" then an error was not induced in a particular run, suggesting that the modeled errors have been covered and that execution should continue normally.

Another example of such a variable is a value of a user-selectable option that defines whether the initialized data is to be saved each time the entry point is reentered after an initial entry. In some instances, a user may wish to back up the global state for each reentry. In some instances, a user may wish to perform the backup of the global state only once, so that for subsequent tests of different negative paths, the same global state is used as a starting point. Storing the variable comprising a value of a user-selectable option in a persistent fashion across reentrances to the entry point can enable this functionality.

The variables can be annotated to go into a particular section 348-N instead of being included with other .data. For example, such an annotation can be ".test_infra_data". The annotation can be performed using compiler-specific attributes (e.g., "_attribute_(section(name))" for a GNU C compiler). Particular directives in the linker instructions can be used to ensure that the annotated sections are not included in the part of the memory between the start 354 and the end 356 of the first portion 358 of the enhanced segment 352-2, so that the annotated sections are not backed up and restored and will persist across reentrances to the entry point.

Figure 4:
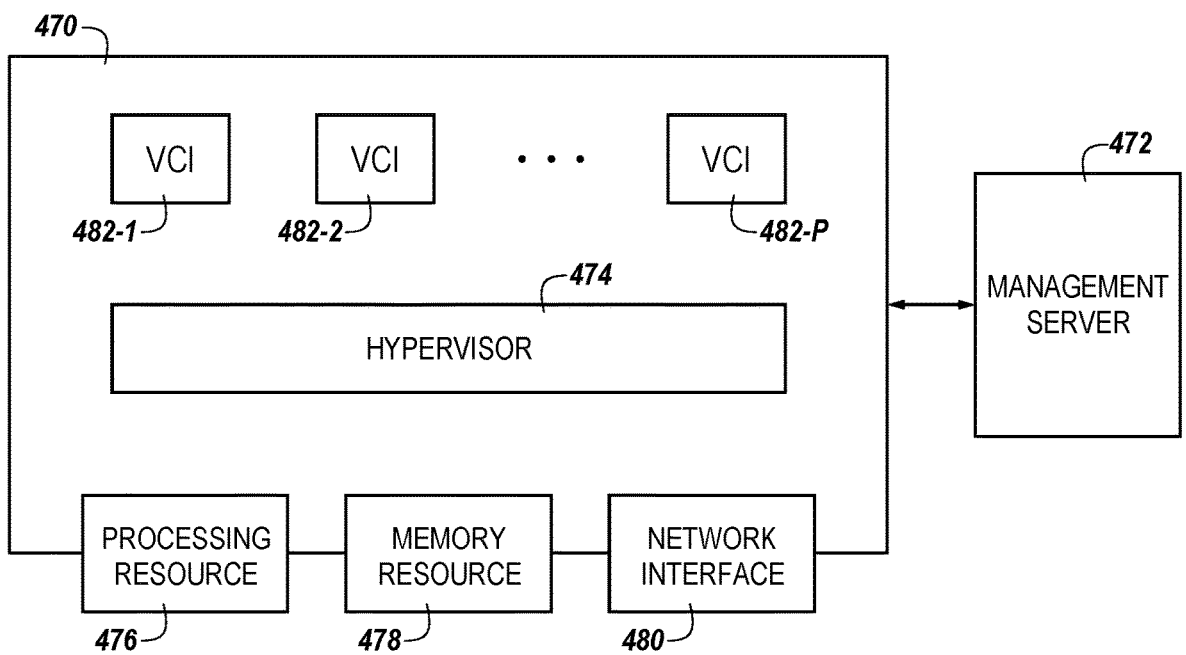
FIG. 4 is a diagram of a system for negative path testing in a bootloader environment according to a number of embodiments of the present disclosure.

FIG. 4 is a diagram of a system for negative path testing in a bootloader environment according to a number of embodiments of the present disclosure. The system can include a host 470 with processing resources 476 (e.g., a number of processors), memory resources 478, and a network interface 480. The host 470 can be coupled to a management server 472. Although not specifically illustrated, the management server can include processing resources, memory resources, and a network interface.

Memory resources 478 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media. Although not specifically illustrated, the memory resources 478 can store machine readable and executable instructions to perform various functions as described herein.

For example, the instructions can be executable by the processing resources 476 to back up mutable portions of a component under test. The instructions can be executable to inject a first fault to trigger a first error in the component under test in a bootloader environment (e.g., in a bootloader environment of the hypervisor 474). The instructions can be executable to execute error handling instructions until a first checkpoint of the component under test in the bootloader environment. The instructions can be executable to restore the mutable portions to the component under test from the backup and to restart the component under test. The instructions can be executable to inject a second fault to trigger a second error in the component under test in the bootloader environment and to execute error handling instructions until a second checkpoint of the component under test in the bootloader environment is reached. Either of the first and the second checkpoint can be a success or failure of the error handling code to address the first error. The instructions can be executable to report whether the error handling instructions successfully addressed the first error and the second error.

The processing resources 476 can be coupled to the memory resources 478 via a communication path. The communication path can be local or remote to the host 470. Examples of a local communication path can include an electronic bus internal to a machine, where the memory resources 478 are in communication with the processing resources 476 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path can be such that the memory resources 478 are remote from the processing resources 476, such as in a network connection between the memory resources 478 and the processing resources 476. That is, the communication path can be a network connection. Examples of such a network connection can include a local area network (LAN), wide area network (WAN), personal area network (PAN), and the Internet, among others.

The host 470 can be included in a software defined data center. A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 470 can incorporate a hypervisor 474 that can execute a first number of virtual computing instances (VCIs) 482-1, 482-2, . . . , 482-N (referred to generally as VCIs 482). VCIs, such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications.

The term "virtual computing instance" covers a range of computing functionality. The term "virtual machine" refers generally to an isolated user space instance, which can be executed within a virtualized environment. Other technologies aside from hardware virtualization can provide isolated user space instances, also referred to as data compute nodes. Data compute nodes may include non-virtualized physical hosts, virtual machines (VMs), containers that run on top of a host operating system without a hypervisor or separate operating system, and/or hypervisor kernel network interface modules, among others. Hypervisor kernel network interface modules are non-VM data compute nodes that include a network stack with a hypervisor kernel network interface and receive/transmit threads.

The VCIs 482 can be provisioned with processing resources 476 and/or memory resources 478 and can communicate via the network interface 480. The processing resources 476 and the memory resources 478 provisioned to the VCIs 482 can be local and/or remote to the host 470. For example, in a software defined data center, the VCIs 482 can be provisioned with resources that are generally available to the software defined data center and not tied to any particular hardware device. By way of example, the memory resources 478 can include volatile and/or non-volatile memory available to the VCIs 482. The VCIs 482 can be moved to different hosts (not specifically illustrated), such that a different hypervisor manages the VCIs 482.

VCIs 482, in some embodiments, operate with their own guest operating systems 336 on the host 470 using processing resources 476, memory resources 478, and a network interface 480 of the host 470 virtualized by virtualization software (e.g., a hypervisor 474, virtual machine monitor, etc.). The tenant (i.e., the owner of the VCI 482) can choose which applications to operate on top of the guest operating system 336. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for negative path testing in a bootloader environment, comprising:
   backing up a global state of a component under test in a file, the file containing a mutable version of the global state and an immutable version of the global state;
   injecting a fault to trigger an error in the component under test in a bootloader environment;
   executing error handling instructions until a checkpoint of the component under test in the bootloader environment is reached;
   restoring the global state to the component under test from the backup by using the immutable version of the global state; and
   restarting the component under test.

2. The method of claim 1, wherein restarting the component under test comprises restarting the component under test while in the bootloader environment.

3. The method of claim 1, further comprising injecting a second fault to trigger a second error in the component under test after restarting the component under test.

4. The method of claim 1, further comprising:
   backing up the global state of the component under test;
   injecting a different fault to trigger a different error in the component under test for each iteration;
   executing error handling instructions until a checkpoint of the component under test;
   restoring the global state to the component under test from a previous backup; and
   restarting the component under test.

5. The method of claim 4, further comprising:
   maintaining a count of a quantity of iterations that is stored separately from the global state such that the count is not backed up or restored; and
   iterating until the count equals a predefined quantity of modelled errors.

6. The method of claim 1, further comprising:
   injecting a different fault to trigger a different error in the component under test for each iteration without iteratively backing up the global state;
   executing error handling instructions until a checkpoint of the component under test is reached;
   restoring the global state to the component under test from the backup; and
   restarting the component under test.

7. The method of claim 1, further comprising:
   modeling the error in the component under test; and
   developing the error handling instructions based on the modelling.

8. A non-transitory computer readable medium storing instructions for negative path testing in a bootloader environment, the instructions, when executed by a processor, cause the processor to at least:
   back up a global state of a component under test in a file, the file containing a mutable version of the global state and an immutable version of the global state;
   inject a fault to trigger an error in the component under test in a bootloader environment;
   execute error handling instructions until a checkpoint of the component under test in the bootloader environment is reached;
   restore the global state to the component under test from the backup by using the immutable version of the global state; and
   restart the component under test.

9. The non-transitory computer readable medium of claim 8, wherein the instructions cause the processor to perform processing resource architecture-specific operations to ensure that the processing resource is in an expected state for the entry point to the component under test prior to branching to the entry point.

10. The non-transitory computer readable medium of claim 8, wherein the instructions are executed in a bootloader environment.

11. The non-transitory computer readable medium of claim 8, wherein the instructions cause the processor to maintain a state of a plurality of variables across reentrances to the entry point in a particular section separate from the data sections wherein the particular section is not subject to the instructions to save and to restore the global state.

12. The non-transitory computer readable medium of claim 11, wherein a first variable of the plurality of variables comprises a counter for a quantity of reentries to the entry point.

13. The non-transitory computer readable medium of claim 12, wherein a second variable of the plurality of variables comprises a value of a user-selectable option that defines whether the global state is to be saved each time the entry point is reentered after an initial reentry.

14. The non-transitory computer readable medium of claim 11, wherein the instructions to inject the fault comprises instructions to inject a different fault to trigger a different error for each reentrance to the entry point.

15. A system for negative path testing in a bootloader environment, comprising:
at least one processor; and
a memory storing instructions executable by the processor, the instructions causing the at least one processor to at least:
back up a global state of a component under test in a file, the file containing a mutable version of the global state and an immutable version of the global state;
inject a fault to trigger an error in the component under test in a bootloader environment;
execute error handling instructions until a checkpoint of the component under test in the bootloader environment is reached;
restore the global state to the component under test from the backup by using the immutable version of the global state; and
restart the component under test.

16. The system of claim 15, wherein the instructions cause the processor to perform processing resource architecture-specific operations to ensure that the processing resource is in an expected state for the entry point to the component under test prior to branching to the entry point.

17. The system of claim 15, wherein the instructions are executed in a bootloader environment.

18. The system of claim 17, wherein the instructions cause the at least one processor to maintain a state of a plurality of variables across reentrances to the entry point in a particular section separate from the data sections and wherein the particular section is not subject to the instructions to save and to restore the global state.

19. The system of claim 18, wherein a second variable of the plurality of variables comprises a value of a user-selectable option that defines whether the global state is to be saved each time the entry point is reentered after an initial reentry.

20. The system of claim 18, wherein the instructions to inject the fault comprises instructions to inject a different fault to trigger a different error for each reentrance to the entry point.

* * * * *